United States Patent

Tewksbury

[15] 3,706,944

[45] Dec. 19, 1972

[54] DISCRETE ADAPTIVE DELTA MODULATOR

[72] Inventor: Stuart Keene Tewksbury, Long Branch, N.J.

[73] Assignee: Bell Telephone Laboratories, Incorporated, Murray Hill, N.J.

[22] Filed: Dec. 2, 1970

[21] Appl. No.: 94,458

[52] U.S. Cl. ................................332/11 D, 325/38 B

[51] Int. Cl. ............................................H03k 13/22

[58] Field of Search...332/11, 11 D, 1; 325/38, 38 A, 325/38 B; 179/15 AP

[56] References Cited

UNITED STATES PATENTS

| | | | |
|---|---|---|---|
| 3,609,551 | 9/1971 | Brown | 332/11 D X |
| 3,273,141 | 9/1966 | Hackett | 325/38 B X |
| 3,270,335 | 8/1966 | Hackett | 325/38 B X |
| 3,497,624 | 2/1970 | Brolin | 332/11 D X |
| 3,500,441 | 3/1970 | Brolin | 332/11 D X |
| 3,461,244 | 8/1969 | Brolin | 325/38 B X |

OTHER PUBLICATIONS chindler, "Delta Coder," Jan. 1971, IBM Technical Disclosure Bulletin, Vol. 13, No. 8, page 2375.

*Primary Examiner*—Alfred L. Brody
*Attorney*—R. J. Guenther and Kenneth B. Hamlin

[57] ABSTRACT

A discrete adaptive delta modulator (DADM) comprising a comparator, a quantizer and a sampling pulse generator operating at the rate $f_2$ is characterized in that complex analog feedback circuitry is replaced by a programmable pulse generator operating at the rate $f_t$, which provides a controlled number of pulses $k$ during each sampling period $1/f_2$ to a single step-size analog feedback integrator. The number of pulses $k$ provided by the programmable generator multiplied by the basic step size $\sigma_o$ of the feedback integrator determines the step-size $\sigma_k$ in the feedback signal. This DADM is readily implemented in integrated circuit form and retains such advantages of the nonadaptive delta modulator as circuit simplicity and the requirement of only a single adjustable basic step size $\sigma_o$. The number $n$ of available step sizes $\sigma_k$, which is determined by the ratio of the generator rates $f_t$ and $f_s$, can be several hundred compared to a maximum of ten in a conventional DADM.

13 Claims, 8 Drawing Figures

INVENTOR
S.K. TEWKSBURY
BY
J.P. Kearns
ATTORNEY

DISCRETE ADAPTIVE DELTA MODULATOR

FIELD OF THE INVENTION

This invention relates to digital date transmission systems and in particular to discrete adaptive delta modulators.

BACKGROUND OF THE INVENTION

In a single step-size nonadaptive delta modulator (DM), an analog input signal to be encoded and transmitted is sampled at the rate $f_s$ to yield a sequence of positive and negative digital pulses. The digital pulses are transmitted and also fed back to an integrator whose output increases or decreases in discrete single-valved steps $\sigma_0$. Finally, the integrator output single and the analog input signal are applied to a comparator whose output is sampled as above. Because the steps are single valued, one of the inherent drawbacks of conventional nonadaptive DM is an inability to follow an analog input signal whose change in amplitude from one sampling instant to the next exceeds the basic step size $\sigma_o$ of the system. This inability to follow a rapidly varying analog input signal results in slope overload distortion. The problem of slope overload distortion cannot be satisfactorily corrected by merely increasing the basic step size, since then an increase in quantizing noise would result at the smaller analog input signal amplitudes. Therefore, in spite of its simple circuit structure, the nonadaptive DM retains the disadvantage of requiring a high sampling rate which, in turn, necessitates a large channel bandwidth.

The Discrete Adaptive Delta Modulator (hereafter abbreviated DADM) overcomes the limitations of the nonadaptive DM by responding automatically to changing input signal parameters. The DADM monitors the digital output signal and in response thereto changes the step size $\sigma_k$ of the integrator and hence the amplitude of the feedback signal. Therefore, a slope in the analog input signal greater than $\sigma_0 f_s$, where $\sigma_0$is the feedback integrator basic step size and $f_s$ is the sampling rate, forces the circuit into slope overload whereupon the step size $\sigma_k$ is continually increased until the feedback signal attains the analog input signal amplitude or until the maximum step size $\sigma_r$ is reached. Generally, once the feedback signal attains the analog input level, the feedback signal oscillates about this input level while the step size $\sigma_k$ continually decreases to the basic step size $\sigma_0$.

Although the conventional DADM substantially eliminates problems of slope overload and the requirement of a high sampling rate, the need remains for complex analog feedback circuitry which is difficult to implement in integrated-circuit form and which requires a plurality of precise adjustments. In other words, the conventional DADM requires tight tolerance control to insure that the various step sizes $\sigma_0 \ldots \sigma_k \ldots \sigma_n$ are in the correct ratios.

It is therefore an object of this invention to provide a new and improved DADM for encoding analog signals.

It is another object of this invention to provide a simple, flexible, and economical variable step size delta modulator.

It is a further object of this invention to provide a DADM without the need for complex analog feedback circuitry.

It is a still further object of this invention to provide a DADM requiring adjustments in digital components rather than in analog components.

It is yet another object of this invention to provide a single device having the simplicity of a conventional nonadaptive DM which can be used to produce variable sampling rate and variable step-size adaptability.

It is an additional object of this invention to provide a universal DM circuit which can be realized in integrated-circuit form and can be easily converted into a DADM with the addition of external digital logic.

SUMMARY OF THE INVENTION

According to the present invention, a discrete adaptive delta modulator (DADM) comprises a comparator, a quantizer and a single step-size analog feedback integrator for producing step sizes $\sigma_k$which are integral composites of the integrator basic step size $\sigma_0$, as determined by the ratio of the programmable and sampling pulse generator rates $f_t$ and $f_s$, respectively.

According to a first illustrative embodiment of the invention, a DADM substantially comprises a comparator, a flip-flop, a sampling pulse generator operating at the rate $f_s$, first and second logic gates, a charge parcelling feedback integrator, adaption logic, a counter, a pulse rate selector operating at the rate $f_t$ and a high rate clock source operating at the rate $f_{tmax}$. The adaption logic, which responds to the digital output signal of the flip-flop, controls the count of the counter. The counter then determines which subfrequency $f_t$ of the high rate clock source is emitted by the pulse rate selector. The logic gates, which are jointly responsive to the pulse rate selector output at the rate $f_t$ and the complementary outputs of the flip-flop at the rate $f_s$, provide an integral number of pulses given by the ratio $k = f_t/f_s$ to the charge parcelling feedback integrator during the sampling period $1/f_s$. The charge parcelling integrator output, which is the feedback signal, and the analog input signal are then applied to the comparator. Finally, the comparator output and the sampling pulse generator output at the rate $f_s$ drive the complementary inputs of the flip-flop. Therefore, the step size $\sigma_k$ in the feedback signal is determined by the product of the integrator basic step size $\sigma_0$ and the integral number of pulses $k$ provided by the logic gates.

According to a second illustrative embodiment of the invention, a DADM comprises a comparator, a quantizer, a single step-size analog feedback integrator, a variable sampling pulse generator operating at the rate $f_s$, and a programmable pulse generator operating at the rate $f_t$. The sampling generator and the programmable generator individually comprise adaption logic, a counter, a pulse rate selector, and clock sources operating at the rates $f_{smax}$ and $f_{tmax}$, respectively. The adaption logics, which respond to the digital output signal of the quantizer, determine which subfrequencies $f_s$ and $f_t$ are emitted by the respective pulse rate selectors. The feedback integrator, which is jointly responsive to the pulse rate selector operating at the rate $f_t$ and to the quantizer operating at the rate $f_s$, and thereby receiving an integral number of pulses given by $k = f_t/f_s$, produces the feedback signal. The feedback signal and the analog input signal are then applied to the comparator. Finally, the comparator output and the pulse rate selector output at the rate $f_s$ drive the quantizer. Therefore, the step-size $\sigma_k$ in the feedback signal is determined by the product of the integrator basic step size $\sigma_0$ and the integral number of pulses $k$ provided by the pulse rate selector operating at the rate $f_i$.

It is therefore an advantage of this invention that it provides the characteristics of a complex DADM while keeping the simple circuit structure of a conventional nonadaptive DM.

It is another advantage of this invention that it is readily realized in integrated-circuit form since many former analog functions are now performed digitally.

It is a further advantage of this invention that it requires a single step-size analog feedback integrator rather than a complex feedback integrator.

It is a still further advantage of this invention that it requires a relatively low sampling rate and therefore a low transmission channel bandwidth.

It is a feature of this invention that the step sizes and the number of distinct step sizes can easily be changed by modifying a programmable pulse generator.

It is another feature of this invention that the step sizes and the sampling rate can be varied in accordance with any characteristic of the analog input signal.

It is a further feature of this invention that the single step-size analog feedback integrator is pulsed at a rate greater than or equal to the sampling rate.

It is a still further feature of this invention that the various step sizes are automatically precise.

It is yet another feature of this invention that the number of distinct step sizes is determined by the ratio of the integrator pulsing rate and the sampling rate.

DESCRIPTION OF THE DRAWING

The above and other objects, features and advantages of this invention will be better appreciated by a consideration of the following detailed description and the drawing in which.

DETAILED DESCRIPTION

Figure 1A:
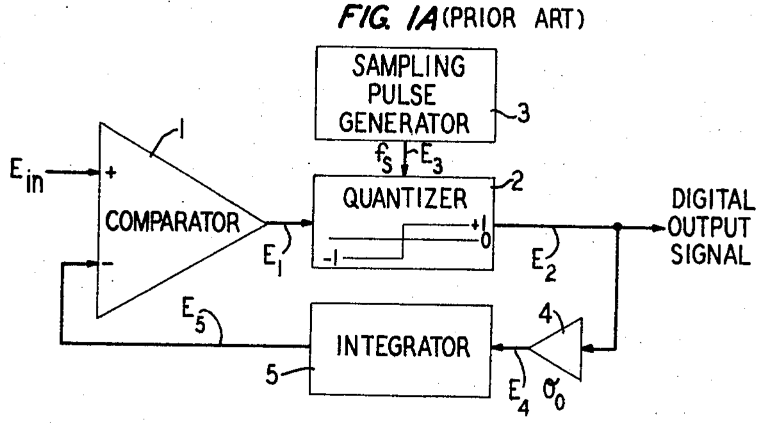
FIG. 1A (PRIOR ART)
FIG. 1A is a block diagram representation of a conventional single step-size nonadaptive delta modulator (DM) and FIG. 1B shows the analog input signal and the corresponding feedback signal.

FIG. 1A is a block diagram representation of a single step-size nonadaptive delta modulator (DM) according to the prior art comprising comparator 1, quantizer 2, sampling pulse generator 3 operating at the rate $f_s$, gain device 4, and feedback integrator 5. The combination of gain device 4 and integrator 5 can be considered a single step-size analog integrator. For illustrative purposes it is assumed that the analog input signal is the smooth wave form $E_{in}$ of FIG. 1B. Sampling pulse generator 3 emits pulses at the rate $f_s$ to quantizer 2 which, in turn, emits a positive or negative unit pulse for each pulse from generator 3. Digital output signal $E_2$ of quantizer 2 is amplified by the fixed amount $\sigma_0$ in gain device 4. The amplified signal $E_4$ is then applied to integrator 5 which has its output $E_5$ coupled to the negative input terminal of comparator 1. Comparator 1 compares signals $E_{in}$ and $E_5$, thereby providing an output $E_1$ whose polarity is determined by the sense of the difference $E_{in} - E_5$. Output $E_1$ of comparator 1 is applied to quantizer 2 which emits a positive unit pulse when the difference signal $E_1$ is positive and a negative unit pulse when the difference signal $E_1$ is negative. Therefore, comparator 1 determines at each sampling instant, that is, whenever generator 3 emits a sampling pulse, whether the unit pulse emitted by quantizer 2 is positive or negative and such a determination is dependent upon feedback signal $E_5$ obtained from integrator 5. Therefore, sampling of the analog input signal $E_{in}$ occurs at periodic intervals which are determined by the pulses from generator 3.

Figure 1B:
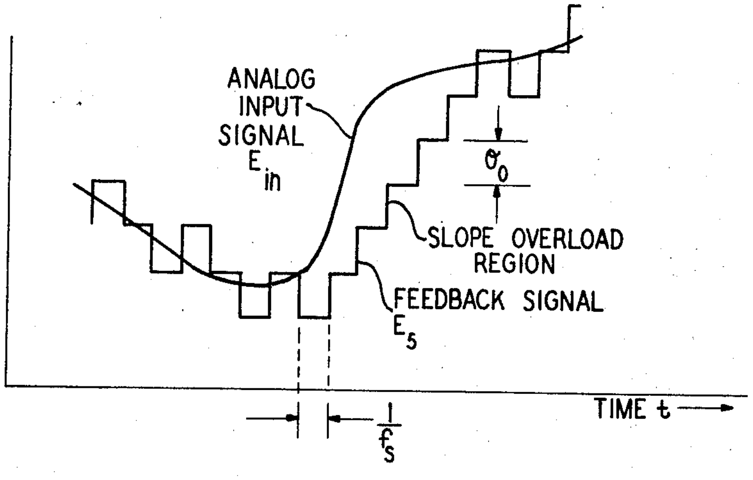

FIG. 1B shows the analog input signal $E_{in}$ and the feedback signal $E_5$. In accordance with the above description, for each positive unit pulse emitted by quantizer 2, output $E_5$ of integrator 5 rises by one step $\sigma_0$ and for each negative unit pulse emitted by quantizer 2, output $E_5$ decreases by one step $\sigma_0$. Output $E_5$ therefore is a stepped waveform which changes by only one step $\sigma_0$ each sampling interval.

In the circuit of FIG. 1A the digital output signal $E_2$ merely indicates the direction of change of the analog input signal $E_{in}$ at each sampling instant rather than the actual magnitude of the change. Because the feedback signal $E_5$ can change only one step $\sigma_0$ per sampling pulse, the feedback signal cannot closely follow $E_{in}$ when $E_{in}$ changes rapidly. The largest slope $|E_{in}'(t)|$ that such a conventional nonadaptive DM can reproduce is one changing by one step $\sigma_0$ every sampling interval. In other words, the slope capability of the DM is $\sigma_0 f_s$, where $\sigma_0$ is the basic step size and $f_s$ is the sampling rate of generator 3, and this slope capability must be greater than or equal to $|E_{in}'(t)|$, where the prime represents the derivative of the analog input signal with respect to time. An example of slope overload is shown in FIG. 1B. A serious disadvantage of conventional nonadaptive DM is thus the inability to follow rapidly changing analog input signals.

A well-known practice of the prior art is to delete transmission of the negative pulses without affecting the logical design of the receiver.

Figure 2B:
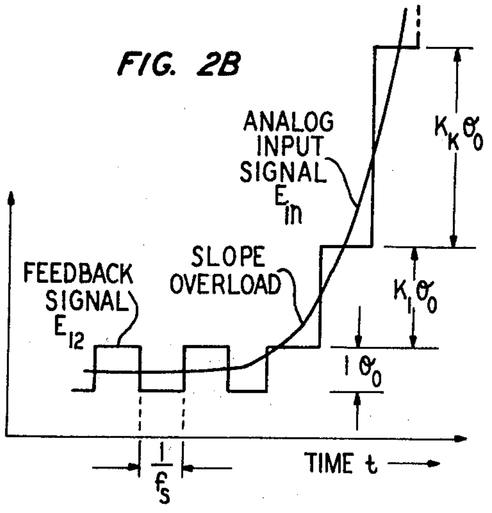
FIG. 2A is a block diagram representation of a conventional discrete adaptive delta modulator (DADM) and FIG. 2B shows the analog input signal and the corresponding feedback signal.
Figure 2A:
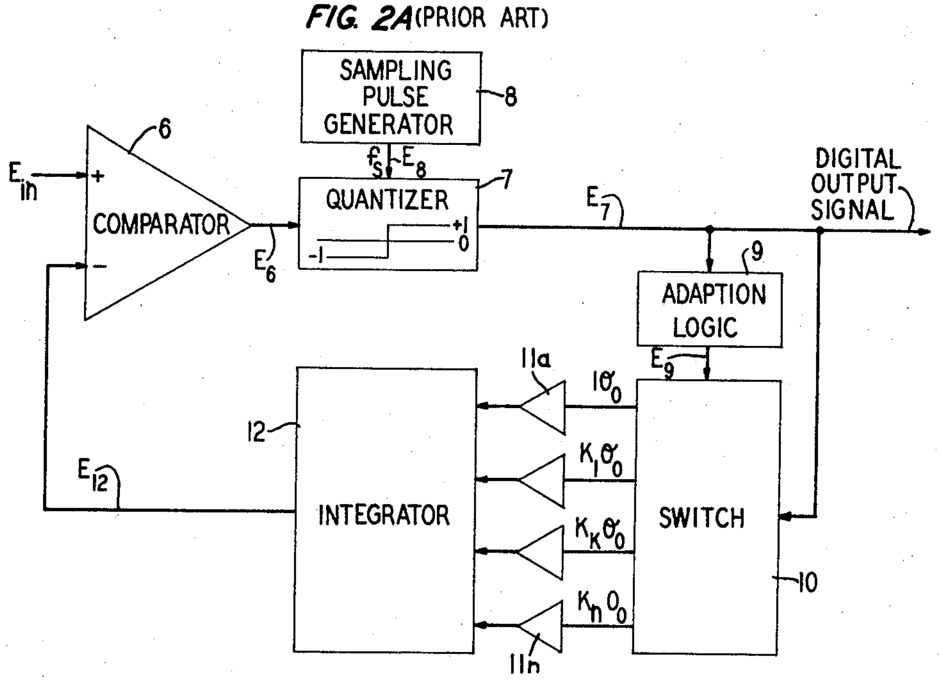
FIG. 2A (PRIOR ART)

FIG. 2A is a block diagram representation of a discrete adaptive delta modulator (DADM) of the prior art comprising comparator 6, quantizer 7, sampling pulse generator 8 operating at the rate $f_s$, adaption logic 9, switch 10, gain devices $11_2 \ldots 11_n$, and integrator 12. While comparator 6, quantizer 7, and sampling pulse generator 8 function in the same manner as the respective elements of FIG. 1A, the present circuit essentially comprises variable step-size analog feedback circuitry rather than single step-size analog feedback circuitry. In this circuit, adaption logic 9 responds to the digital output signal $E_7$ and controls switch 10. Switch 10 then applies the digital output signal to the appropriate gain device $11_k$ for amplification by the factor $K_k\sigma_0$. The output of gain device $11_k$ is applied to integrator 12 as the step size $K_k\sigma_0$, since the digital output signal consists of positive and negative unit pulses. Finally, the output of integrator 12 is applied to the negative input terminal of comparator 6. In other words, this circuit has an adaptive slope capability given by $K_k\sigma_0 f_s$, where $K_k\sigma_0$ is the particular gain factor chosen by switch 10, $\sigma_0$ is the basic step size associated with the feedback circuitry, and $f_s$ is the sampling rate of generator 8. Generally, $\sigma$ and $f_s$ are assumed to be constant. Adaption logic of the type described herein is well known in the prior art.

In the DADM of FIG. 2A, switch 10 chooses, in effect, a gain $K_k\sigma_0$ by which to multiply the digital output signal $E_7$. This choice of the gain is made by adaption logic 9 and is based on observations of the sequence of positive and negative unit pulses making up the digital output signal $E_7$. For example, when there is initial slope overload as shown in FIG. 2B, output $E_7$ is a sequence of positive unit pulses. In response to this sequence of positive unit pulses, switch 10 selects a gain $K_1\sigma_0$ greater than $\sigma_0$ such that the new larger step size is $K_1\sigma_0$. If the digital output signal continues to be made up of positive unit pulses, the step size is incrementally increased at the sampling rate of $f_s$ to $K_2\sigma_0$, $K_3\sigma_0$, etc., until the largest value $K_n\sigma_0$ is reached. The step size incrementally decreases when the polarity of the output pulses reverses. It can therefore be seen that slope overload is not a controlling degradation until the derivative $|E_{in}'(t)|$ of the analog input signal $E_{in}$ is greater than the maximum slope capability of the system which is given by $K_n\sigma_0 f_s$. In spite of this advantage, the conventional DADM requires complex analog feedback circuitry as exemplified by switch 10 and gain devices $11_a \ldots 11_n$. Also, in order to change the available step sizes $\sigma_k = K_k\sigma_0$, all $K_k$ must be precisely adjusted thereby requiring close tolerance control, even though a common source for $\sigma_0$ is utilized. Finally, in the conventional DADM, it has been determined that the number of available step sizes $n$ is limited by the complexity of the analog feedback circuitry.

Figure 3A:
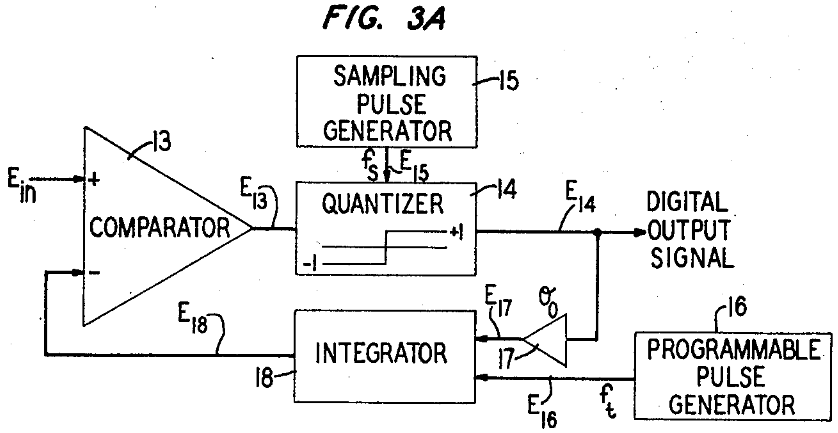
FIG. 3A is a block diagram representation of a DADM according to the present invention and FIG. 3B shows the analog input signal and the corresponding feedback signal.

FIG. 3A is a block diagram representation of a DADM according to the present invention comprising comparator 13, quantizer 14, sampling pulse generator 15 operating at the rate $f_s$, programmable pulse generator 16 operating at the rate $f_t$, gain device 17 and integrator 18. Several components of this circuit are substantially the same and operate in substantially the same manner as the components of the conventional nonadaptive DM of FIG. 1A and the conventional DADM of FIG. 2A except that integrator 18 is pulsed by programmable pulse generator 16 at a rate other than the sampling rate $f_s$. The rate at which integrator 18 is pulsed is called the toggle rate $f_t$.

It will be recalled that quantizer 2 of FIG. 1A provides the digital output signal to integrator 5 at a rate determined by sampling pulse generator 3. Accordingly, the output of integrator 5 changes by the basic step size $\sigma_0$ only once during each sampling interval. However, in the circuit of FIG. 3A, even though quantizer 14 provides the digital output signal to integrator 18 at the sampling rate $f_s$, the output of integrator 18, which is the feedback signal, changes by the basic step size $\sigma_0$ an integral number of times $k$ during each sampling interval.

Figure 3B:
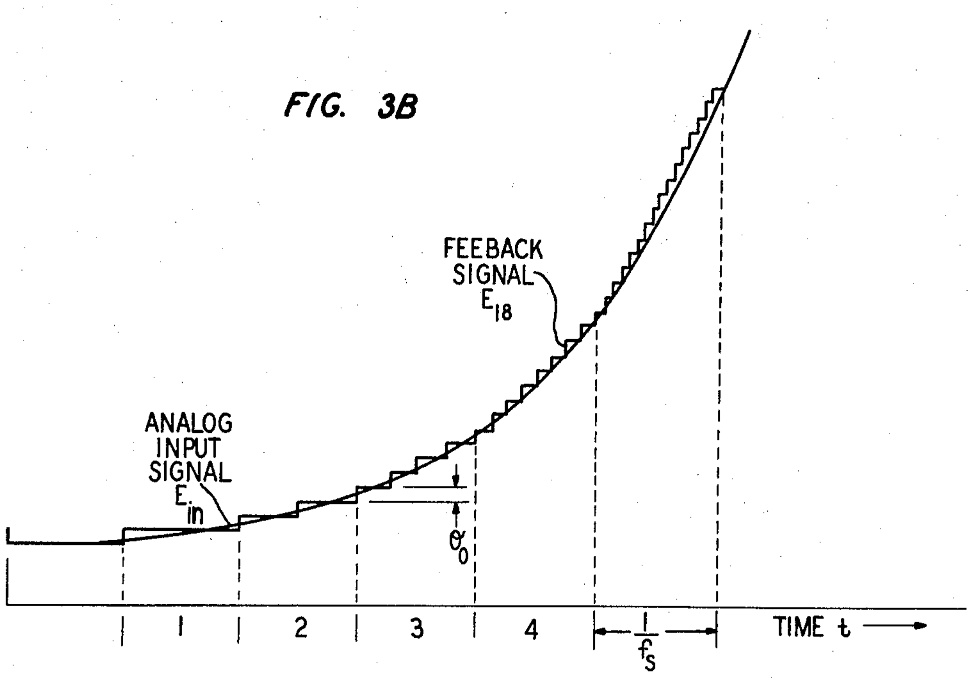

For purposes of explanation, suppose that the sampling rate $f_s = 50$KHz and the toggle rate $f_t$ is such that $f_s \leq f_t \leq f_{t\,max} = 12.8$MHz. If $\lambda = f_{t\,max}/f_s$, then $\lambda$ equals 256. Therefore the number $k$ of clock pulses from generator 16 that can be applied to integrator 18 during any sampling period $1/f_s$ ranges from 1 to 256. In FIG. 3B, which shows feedback signal $E_{18}$, it can readily be seen that integrator 18 was pulsed positively once during interval 1, twice during interval 2, four times during interval 3 and eight times during interval 4. Therefore, in this case the increase in the feedback signal during intervals 1 through 4 is binarily weighted at $1\sigma_0$, $2\sigma_0$, $4\sigma_0$ and $8\sigma_0$, respectively. In effect, 256 possible step sizes $\sigma_k$ are available in the present DADM compared to a much smaller number available in the conventional DADM. The number of clock pulses made available to integrator 18 during any sampling period by programmable pulse generator 16 can be dependent upon the digital output signal $E_{14}$ and the particular circuitry utilized to follow $E_{14}$.

It should be noted that programmable pulse generator 16 of FIG. 3A can be shared simultaneously by several DADM's to provide the correct number of pulses to the respective feedback integrators. Simple gating circuitry, responsive to the respective digital output signals, could be utilized. This, to some extent, would reduce perchannel complexity.

Figure 4:
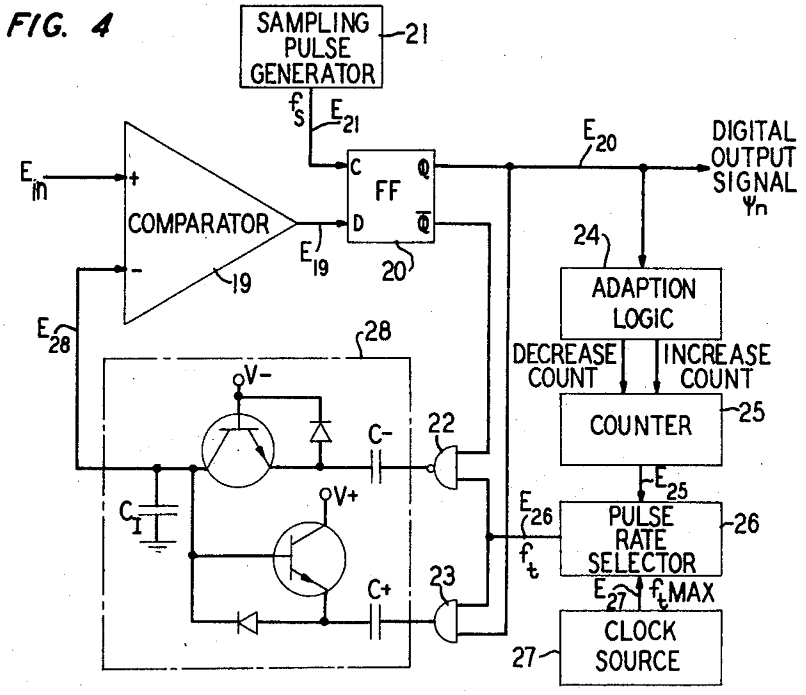
FIG. 4 is a detailed diagram of a first illustrative embodiment of a DADM according to the present invention.

FIG. 4 is a detailed diagram of a first illustrative embodiment of a DADM according to the present invention. Flip-flop 20 corresponds to quantizer 14. Gates 22 and 23 and integrator 28, in combination, correspond to integrator 18 and gain device 17. Also, adaption logic 24, counter 25, pulse rate selector 26 and clock source 27 operating at the rate $f_{t\,max}$, in combination, correspond to programmable pulse generator 16. Flip-flop 20 performs the sampling function and gates 22 and 23 drive feedback integrator 28. It can readily be seen that gates 22 and 23 are not driven exclusively by the output of sampling pulse generator 21 by way of flip-flop 20. Comparator 19 provides the difference $E_{in}-E_{28}$ which is then sampled by flip-flop 20 to give the digital output signal $E_{20}$, a sequence of positive and negative unit pulses designated $\psi_n$.

Gate 23 provides a positive unit pulse to integrator 28 when $\psi_n = +1$ and gate 22 provides a negative unit pulse to integrator 28 when $\psi_n = -1$. This integration technique, which results in the application of a quantum of charge to integrating capacitor $C_I$, is known as charge parcelling integration and is described fully in copending application Ser. No. 884,058, filed on Dec. 1, 1969 by R. R. Laane and B. T. Murphy. In effect, when $\psi_n = +1$ or $-1$, a controlled amount of charge independent of $E_{28}$ is added to or subtracted from integrating capacitor $C_I$. The charge transfer is completed within a few nanoseconds and the changes in $E_{28}$ is consequently independent of the widths of the pulses from gates 22 and 23. Use of the charge parcelling integration technique avoids step size variations due to timing fluctuations in the circuitry. The feedback signal $E_{28}$ therefore has the staircase appearance shown in FIG. 3B.

Recall that flip-flop 20 samples the comparator difference output $E_{19}$ to yield the sequence $\psi_n$. If the analog input signal $E_{in}$ has a slope greater than $\sigma_0 f_s$, where $\sigma_0$ is the basic step size and $f_s$ is the sampling rate of generator 21, the sequence $\psi_n$ satisfies the following:

$\psi_n = \psi_{n-} = \psi_{n-2} = \psi_{n-3} = \ldots$ (Sequence A). Such a pattern of $\psi_n$ denotes the occurrence of slope overload and the length of sequence A can be made to provide a measure of the slope overload severity. If, however, the analog input signal $E_{in}$ changes at a very low rate, then the sequence $\psi_n$ tends to alternate satisfies the following $\psi_n = -\psi_{n-1} = \psi_{n-2} = -\psi_{n-3} = \ldots$ (Sequence B).

Therefore, in the DADM of FIG. 4, adaption logic 24 recognizes the sequences A and B and upon detection of either one increases or decreases the count of counter 25. Adaption logic 24 is well known in the prior art and was described with reference to FIG. 2A. Recall that adaption logic 9 of FIG. 2A responds to digital output signal $E_7$ and controls the selection of a step size $K_k\sigma_0$ by switch 10. However, adaption logic 24 responds to digital output signal $E_{20}$ to control the count of counter 25. The counter output is then used to select the number of pulses from clock source 27 operating at the rate $f_{t\ max}$ that are to be emitted by pulse rate selector 26 at the rate $f_k$ during the sampling period $1/f_s$. Adaption logic 24 therefore indicates to counter 25 what the next step size $\sigma_k$ should be, i.e., the number of pulses $k$ that are to be applied to integrator 28 by pulse rate selector 26.

Gates 22 and 23 are responsive to the output of pulse rate selector 26 and cause integrator 28 to continually charge, discharge or alternately charge and discharge an integral number of times during each sampling period $1/f_s$ according to the occurrence of either sequence A or B. Therefore, the DADM of FIG. 4 can track rapidly varying analog input signals, yet still provides high resolution encoding of slowly varying analog input signals. Also, the number $n$ and values of the distinct step sizes $\sigma_k$ can usually be modified without changes in comparator 19, flip-flop 20, gates 22 and 23 and integrator 28.

The circuit of FIG. 4 can be practiced in several ways depending upon individual needs. For instance, in order to reduce synchronization problems, the output of clock source 27 at the rate $f_{t\ max}$ can be divided in a frequency divider circuit having an appropriate divisor to yield the sampling rate $f_s$. Therefore, a separate sampling pulse generator 21 is not necessary. In the alternative, the output of sampling pulse generator 21 at the rate $f_s$ can be multiplied in a frequency multiplication circuit having an appropriate multiplication factor to yield the clock rate $f_{t\ max}$. In such a case a separate clock source 27 is not necessary. Also, pulse rate selector 26 could be a binary rate multiplier in which case the number $k$ of clock pulses provided thereby during any sampling period $1/f_s$ could be any number from 1 to $\lambda = f_{t\ max}/f_s$, where $f_{t\ max}$ is the operating rate of clock source 27. Generally, $f_{t\ max}$ is limited by the maximum rate at which integrator 28 can be toggled. Therefore, the possible step sizes would be $\sigma_k = k\sigma_o$, where $1 \le k \le \lambda$. Binary rate multipliers, as discussed above, are well known in the prior art. In addition, counter 25 can be a binary counter such that the number $k$ of clock pulses provided by pulse rate selector 26 during any sampling period $1/f_s$ occur in powers of 2 up to $f_{t\ max}$. Therefore, the possible step sizes are $\sigma_k = 2^k\sigma_0$, where $o \le k \le \log_2\lambda$. Whenever the latter series of step sizes is used there results exponential adaption. Finally, although not generally used, a zero step size $0\sigma_0$ could be included in either of the above sets $\sigma_k$ in order to reduce idle channel quantizing noise.

Figure 5:
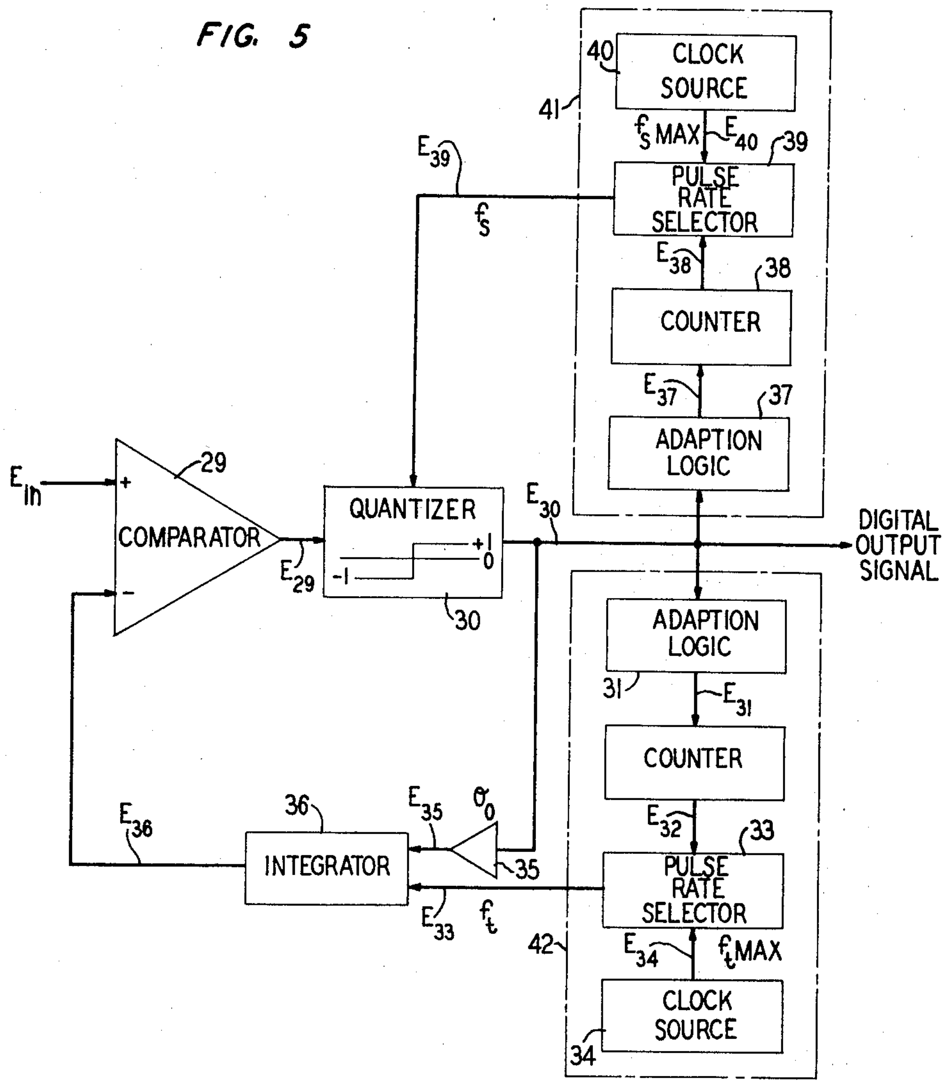
FIG. 5 is a block diagram representation of a second illustrative embodiment of a DADM having a variable sampling rate according to the present invention.

FIG. 5 is a block diagram representation of a second illustrative embodiment of a DADM according to the present invention comprising comparator 29, quantizer 30, gain device 35, integrator 36, sampling pulse generator 41 and programmable pulse generator 42. This circuit is similar to that of FIG. 4 except that the effective sampling pulse rate, as well as the toggling pulse rate, is made adaptive. Thus, clock source 40 operating at the rate $f_{s\ max}$ provides pulses to pulse rate selector 39 rather than directly to quantizer 30. The integral number of pulses emitted by pulse rate selector 39 at the rate $f_s$ is then controlled by adaption logic 37 and counter 38 in response to the digital output signal $E_{30}$ in a manner similar to that already described. Therefore, this circuit can be referred to as a DADM with an adaptive sampler clock since the rate $f_s$ at which pulse rate selector 39 operates is determined by the digital output signal. It should be noted that most conventional DM circuits operate at a constant sampling rate $f_s$. It is apparent from FIG. 5 that quantizer 30 could comprise flip-flop 20 and that gain device 35 and integrator 36 could comprise the combination of gates 22 and 23 and charge parcelling integrator 28 of FIG. 4. Finally pulse rate selector 39 could comprise a binary rate multiplier.

While this invention for a discrete adaptive delta modulator has been described in terms of specific illustrative embodiments, it will be apparent to those skilled in the art that many modifications are possible within the spirit and scope of the disclosed principle.

What is claimed is:

1. A delta modulator for converting an analog input signal into a digital output signal comprising:

comparator means jointly responsive to said analog input signal and a feedback signal for producing a difference signal, means for generating sampling pulses at the rate $f_s$, means jointly responsive to said difference signal and said sampling pulses at the rate $f_s$ for producing said digital output signal, means for generating pulses at the rate $f_t$ greater than or equal to $f_s$, and integrating means jointly responsive to said digital output signal and said pulses at the rate $f_t$ for producing said feedback signal.

2. The delta modulator of claim 1 wherein said digital output signal producing means is a two-level quantizer which emits a first output pulse when said difference signal is positive and emits a second output pulse when said difference signal is negative.

3. The delta modulator of claim 2 wherein said two-level quantizer is a flip-flop.

4. The delta modulator of claim 1 wherein said means for generating pulses at the rate $f_t$ is responsive to said digital output signal.

5. The delta modulator of claim 1 wherein said integrating means is a single step-size analog integrator having the basic step size $\sigma_0$ and wherein amplitude changes $\sigma_k$ in the feedback signal during any sampling interval $1/f_s$ are given by the product of $\sigma_0$ and the number of pulses $k$ applied at the rate $f_t$ to said integrator.

6. The delta modulator of claim 5 wherein said single step-size analog integrator is a charge parcelling integrator.

7. The delta modulator of claim 5 wherein said means for generating pulses at the rate $f_t$ is responsive to said means for generating sampling pulses at the constant rate $f_s$.

8. The delta modulator of claim 5 wherein said means for generating pulses at the rate $f_t$ further comprises:

counter means, adaption logic responsive to said digital output signal for controlling the count of said counter means, a clock source for generating pulses at the constant rate $f_{t\,max}$ greater than or equal to $f_t$, and pulse rate selecting means jointly responsive to said clock source and said counter means for emitting at the rate $f_t$ said number of pulses $k$ numerically equal to the count of said counter means.

9. The delta modulator of claim 8 wherein said pulse rate selecting means is a binary rate multiplier for producing during the interval $1/f_s$ said $k$ pulses ranging in number from 1 to $f_{t\,max}/f_s$.

10. The delta modulator of claim 8 wherein said counter is a binary counter whose count varies from 1 to $f_{t\,max}/f_s$ in powers of 2.

11. The delta modulator of claim 8 wherein said means for generating sampling pulses at the rate $f_s$ is responsive to said clock source which generates pulses at the constant rate $f_{t\,max}$.

12. The delta modulator of claim 5 wherein said sampling pulse generating means is responsive to said digital output signal.

13. The delta modulator of claim 12 wherein said means for generating sampling pulses at the rate $f_s$ further comprises:

counter means, adaption logic responsive to said digital output signal for controlling the count of said counter means, a clock source for generating pulses at the constant rate $f_{s\,max}$ greater than or equal to $f_s$, and pulse rate selecting means jointly controlled by said clock source and said counter means for emitting at the rate $f_s$ a plurality of pulses numerically equal to the count of said counter means.

* * * * *

UNITED STATES PATENT OFFICE

CERTIFICATE OF CORRECTION

Patent No. 3,706,944 Dated December 19, 1972

Inventor(s) Stuart K. Tewksbury

It is certified that error appears in the above-identified patent and that said Letters Patent are hereby corrected as shown below:

Abstract, line 3, "$f_2$" should read --$f_s$--,
line 7, "$f_2$" should read --$f_s$--.

Column 1, line 46, "$\sigma_r$" should read --$\sigma_n$--.

Column 4, line 58, "$11_2$" should read --$11_a$--.

Column 5, line 10, "$\sigma$" should read --$\sigma_0$--.

Column 6, line 56, "changes" should read --change--.

Column 7, line 1, "n-" should read --n-1--;
line 20, "$f_k$" should read --$f_t$--.

Signed and sealed this 22nd day of May 1973.

(SEAL)
Attest:

EDWARD M.FLETCHER,JR.
Attesting Officer

ROBERT GOTTSCHALK
Commissioner of Patents